Figure 1:
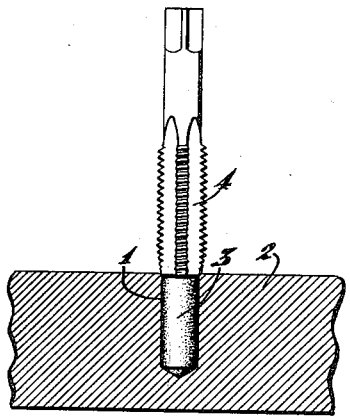

Nov. 13, 1945.  E. M. BOEHMLER  2,388,779
METHOD OF TAPPING
Filed Dec. 16, 1943

INVENTOR.
Erving M. Boehmler
BY Wood, Arey, Herron & Evans
Attorneys.

Patented Nov. 13, 1945

2,388,779

UNITED STATES PATENT OFFICE 2,388,779

METHOD OF TAPPING

Erving M. Boehmler, Madisonville, Ohio, assignor to William B. Petermann and Edmund P. Wood, as trustees Application December 16, 1943, Serial No. 514,521

6 Claims. (Cl. 10—1)

This invention relates to the art of tapping holes to produce screw threads in them. The invention is directed particularly to the tapping of so-called "blind" holes which extend into a workpiece but not through it.

In a conventional tapping operation a hole is drilled which is smaller than the outside of the screw thread to be cut and at least equal to and usually larger than the root diameter or minimum diameter of the thread. A tap is then located over the hole and upon rotation, especially with some longitudinal pressure at the start of the operation, its teeth proceed to cut their way through the material of the workpiece and thereby leave helical grooves which delineate the thread. Once a portion of the thread is established at the mouth of the hole the tap thereafter leads itself into the hole without being pressed toward the workpiece though sometimes the tool is advanced according to a predetermined thread lead in a tapping machine.

While the endwise portion of the tap is chamfered in order to facilitate the cutting action and to distribute the load upon the teeth, still most of the cutting takes place at the first few teeth, and as the operation proceeds the chips which are formed fall away. If the hole is a through hole, emerging from the workpiece at the opposite side, the chips fall out and do not interfere with cutting. However, considerable difficulty is encountered if the hole is blind. In this case the chips are trapped; they accumulate at the bottom of the hole and must be removed before the tap can cut a thread full depth. Usually a so-called "bottoming" tap having very little chamfer at its end is run into the hole to cut the last few threads at the bottom after the chips from the regular tap have been cleared out.

A problem which is considerably more difficult to solve with certainty than the removal of the accumulated chips is caused through the wedging of the chips between the tap teeth and the work when the tool is being backed out of the hole. The contour of the tap teeth usually is not truly circular. The back edge of each tooth is lower than the front or cutting edge to ease the cutting action and to decrease friction. During rotation in a cutting direction the chips are propelled ahead of the cutting edge in the flute space and clear themselves, but when the end of the tool has reached the bottom of the hole (or the top of the pile of chips accumulated in it) and is then rotated in a counter direction or "backed out," some chips become caught or wedged between the tap teeth and the workpiece, in the crevices created by the tooth clearance, or if the tap is circle ground, without relief, the chips catch between the threads and the back edges of the tap teeth.

As the torque of counter rotation increases either the tap snaps off, or if it is sufficiently strong to resist actual breakage, the wedged chips tear into the threads just cut; sometimes some of the teeth of the tap are broken in which event the tap must be discarded. If the tap breaks off within the workpiece then either the work has to be scrapped or the tap extracted carefully to avoid damage to the threads.

While the danger of breaking the tap or tearing the thread varies according to the material of the workpiece, still the problem of tapping blind holes always has been recognized by machinists as an operation much more difficult than the tapping of through holes. The problem of obtaining satisfactory results, with certainty, is greatly accentuated when the threads must be held to precise dimensions.

This invention, briefly, is based upon the concept of advancing the tap by hand or by machine, into a blind hole which has been filled or plugged with an extrudable material, such as a wax, whereby the filling is pushed out of the hole through the tap flutes to immobilize the chips against independent movement and prevent damage to the tap or threads, as the tap advances into the work. According to this method the extrudable material contained within the hole is pressed upon by the forward end of the tap and is therefore subjected to pressure. But, by virtue of its extrudability or plasticity, successive portions of the filling material escape the pressure thus created, through the tap flutes, and a gradual flow takes place along the flutes toward the mouth of the hole as the cutting of the threads proceeds. The chips thus formed become imbedded and bound in this extruded flow of material and are so held that they do not become wedged or caught between the tap teeth and workpiece. By the time the end of the tap has reached the bottom of the hole, all of the filling material has been displaced from it except that contained in the flutes, and this portion is conveyed from the hole when the tap is removed. In actual practice of the invention, the threads cut in this manner are left in a smooth condition and the hole is clean. This result is in pronounced contrast with the result obtained in conventional methods wherein the threads may be torn and the hole, after tapping, contains an accumulation of chips and cutting lubricant which must be flushed away.

The dominant characteristics of the material desirably employed to plug the holes prior to tapping are, physically, its extrudability and capacity to suspend and immobilize the chips against independent movement within the tap flutes and, chemically, its value as a cutting lubricant. A commonplace material displaying both these properties to some degree, though not one best suited for industrial operations, is ordinary candle wax, which is made up of paraffin and stearic acid. Under the pressure created as the tap is threaded into the workpiece the wax is pressed out through the tap flutes and emerges at the mouth of the hole in the form of noodle-like "chips" within which the actual thread chips are imbedded and confined. When the tap is backed out of the hole the filling material not actually pushed out of the hole by the tap tends to stick in the tap flutes and therefore is removed from the hole along with the tap.

Compositions more specifically suited for industrial tapping operations than conventional candle wax may be prepared from a variety of materials having generally similar physical characteristics; these compositions depart from candle wax primarily in respect to the lubrication which they may provide to facilitate the thread cutting operation. Thus, fatty acid soaps or hard greases may be employed which, in addition to having the desired property of plasticity and extrudability, also have a lubricating value. On the other hand, extrudable materials having little or no lubricating value in and of themselves may be rendered suitable for commercial tapping operations by adding to them relatively small proportions of recognized tapping lubricants, for instance, lard oil, sperm oil, sulphur, various extreme pressure lubricants well known in the art, graphite or the like. Paraffin wax in and of itself work satisfactorily though it is somewhat too brittle and crumbly, especially when cold, to produce integral flute chips which remain substantially intact. However, it may be plasticized suitably by the addition of fatty acids such as stearic or palmitic acids, lard oil or the like, and additional lubricating value may be conferred upon it by compounds of the type just described. For instance, a suitable mixture consisting predominantly of mineral wax with a solid fatty acid such as stearic acid may have a specific gravity of approximately .90 to .93; viscosity at 210° F., S. U. V.—60 seconds; melting point of about 165° F.; penetration at 77° F.—10 minutes; and saponification number of 5-15, all values being according to A. S. T. M. methods. It is to be noted that these specifications are representative of one composition which has been suitable and are not disclosed as limitations.

The term "extrudable" as employed in this specification identifies the physical characteristics of a filler or plugging composition which will flow without substantial rupture or fragmentation under the pressure exerted upon it by a tap which is advanced into a hole in which it is confined, as distinguished from a material which will either block the advance of the tap or a material which is so fluid that it will not hold the thread chips from moving around freely in the flutes.

The holes ready to be tapped may be filled or plugged in any suitable manner; for instance, the filler material may be heated to reduce it to a fluid consistency, then poured into the hole and allowed to become congealed or set. A more convenient technique and one better suited for fast production operations contemplates the use of preformed plugs or inserts corresponding substantially to the hole dimensions. These pieces, placed or dropped into the hole by hand or by mechanical inserter ahead of the tap, are prefabricated, as by extrusion and cut-off, or by moulding. In engineering design it is usually considered good practice for the length of the thread to be substantially two and one-half times the outside diameter of the thread since greater length does not provide additional strength. Therefore the plugs of extrudable material may be made in various diameters, the length of the plugs in each size being about two and one-half times the diameter. In the alternative, the plugs may be short in length so that two, three or more of them will fill up the hole.

The application of these principles upon which the invention is based is illustrated further in the drawing in which:

Figure 1 shows a blind hole 1 drilled into a workpiece 2 and filled with extrudable material 3 prior to the introduction of the tap 4. The tap is located above the hole and upon rotation advances into the workpiece displacing the extrudable material.

Figure 2:
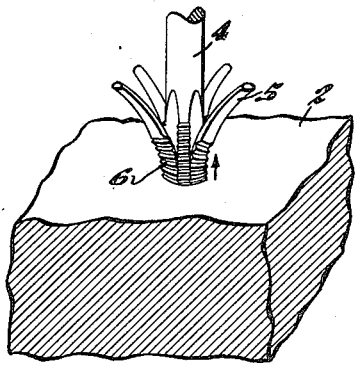

Figure 2 shows the appearance of the parts after the tap has been advanced into the hole and as it is being backed out of the hole. The flute chips 5 rotate with the tap; they may be of substantially continuous length or they may break off depending upon the brittleness or plasticity of the filling material. It may be seen that as the tap is advanced into the work the flute chips pass in a counter direction up through the tap flutes. The material within the flutes conforms to the thread already cut. However, due to the fact that the chips are moving upwardly as the tap is moving downwardly into the workpiece the thread impressions on the chips are sheared away during cutting. When the tap is being backed out then the flute chips move with the tap, fill the flutes completely and bear the thread impression. This is illustrated at the portion designated 6. The chips may be knocked off of the tap very easily though it is not necessary to do so before another hole is tapped inasmuch as the material extruded from the next hole pushes away the flute chips previously formed.

Figure 3:
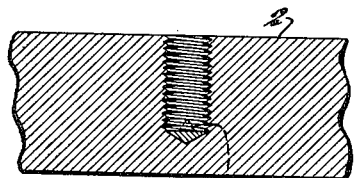

Figure 3 shows the appearance in cross section of a tapped hole just after the tap has been removed. The cutting of the thread was continued until the tap abutted the bottom of the hole, leaving only the conical recess of the drill at the bottom. The tap, of course, was a tool of the "bottoming" type. It will be seen that no chips have accumulated between the bottom of the tap and the bottom of the hole and the threads are clean and smooth. The conical depression at the bottom of the hole corresponding to the end of the tap drill sometimes is filled with material not extruded during tapping. Sometimes this material adheres to the end of the tap and is removed with it. However, when it is not removed it causes no difficulty. It also may be noted that a small conical mound of the extrudable material, 7, may be left at the bottom of the hole as shown by the dotted lines. This corresponds to the center hole which usually is present in taps one quarter of an inch or larger in diameter. This mound also frequently is extracted through adhesion to the end of the tap.

Figure 4:

Figure 4 is an enlarged view of a flute chip which emerges from the tap flute during cutting. The extrudable material which was expelled from the hole as the tap advanced into it is the continuous phase or matrix and is indicated generally at 8 while the actual thread chips cut by the tap are heterogeneously dispersed and held against movement as at 9.

Figure 5:
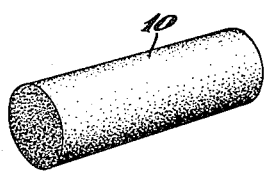
Figure 6:
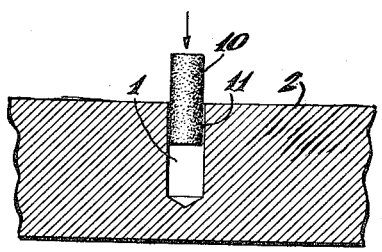

A preformed or prefabricated plug or insert of a size corresponding with the dimensions of a given tap drill is shown in Figure 5 while Figure 6 shows this plug inserted in a tap drilled hole of a workpiece.

Figure 7:
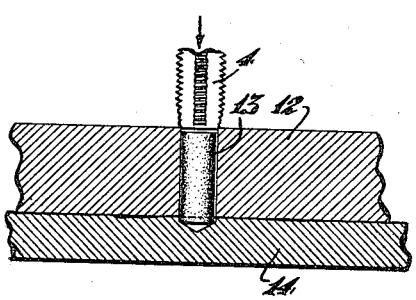

Figure 7 indicates the manner in which the same method may be applied to the tapping of a through hole in a workpiece.

The plug 10, preferably is of such diameter that it may be received freely within the hole; there may, for example, be an annular clearance 11 between the hole and plug of .005" to .010". This is of no consequence inasmuch as the tap presses upon the plug at the start of the tapping operation and collapses it until it fills the hole completely. Further advancement of the tap causes the extrusion of the filler to take place.

The plug or filler material need not extend to the mouth of the hole but may terminate short of the mouth without difficulty because of the fact that the chips from the thread cut at the mouth of the hole are carried away as the material becomes extruded through the tap flutes, and for the further reason that it is not usually necessary to "back out" the tap for the purpose of relieving binding until the thread has been cut for a substantial distance into the workpiece.

The improved results which are provided by this method are not limited to the tapping of ferrous metals. In fact in the tapping of non-ferrous metals and particularly aluminum alloys the improvement is of most pronounced benefit. This is because such metals, though strong and tough, are scored easily and, therefore, the most likely to be torn or damaged by chips when the tap is backed away. The process has been employed with pronounced success in the tapping of ¼-20 and ⅜-16 holes in aluminum alloy castings where the thread dimensions had to be held to .0005 inch tolerance lead error per inch and on pitch diameter. Prior to the application of the present method the life of the precision ground taps was about thirty pieces, with results uncertain and with a high percentage of scrap. Using the same taps and same sized drilled holes in accordance with the present invention the tap life was increased three hundred percent with a corresponding reduction in scrap.

Plastic compositions in which a voluminous thread chip is cut respond with equal satisfaction.

While the invention has been described particularly in relation to the tapping of holes which are blind per se it also contemplates the method wherein "through" holes are converted into "blind" holes in order that the benefits conferred by the improvement may be utilized. An arrangement of this sort is shown in Figure 7 in which the workpiece itself is indicated generally at 12 and contains a hole 13 passing entirely through it. To facilitate the tapping of this hole the workpiece is held within a jig or fixture comprising a backing plate 14 having a surface which closes the opening at the one end of the hole in order that the filler material may be subjected to pressure therein for extrusion at the opposite face of the workpiece. This technique may not be employed as economically as conventional "through" hole tapping and is not recommended where commercial tolerances are allowed, but it is useful when positive lubrication of precision taps is requisite or when damage to the threads from binding of the chips must be prevented.

Having described my invention, I claim:

1. A method of tapping a blind hole which comprises filling the hole with an extrudable material and advancing a tap into the hole to cut threads therein, the filling material being extruded through the flutes of the tap and therein immobilizing the thread chips against independent movement as the tap is advanced into the hole and removing the tap and unexpelled material within its flutes from the hole.

2. The method of tapping a blind hole which comprises advancing a tap into a hole which is filled with a material capable of being extruded through the flutes of the tap under the pressure created upon it by advancement of the tap and capable of holding the chips cut by the tap against independent movement, then reversing the tap to remove it from the hole and thereby convey from the hole unexpelled material and chips contained within the tap flutes.

3. The method of tapping a blind hole which comprises advancing a tap into the blind hole after it has been substantially filled with a waxy material of such viscous and adhesive properties as to impale therein against independent movement the chips cut by the tap, and of such extrudability as to be expelled from the hole with the chips embedded therein under the pressure created by the tap advancement.

4. The method of tapping which comprises advancing a tap into a blind hole which is substantially filled with a wax-like material having the capacity to hold the chips cut by the tap against independent movement and also having the capacity to be extruded through the tap flutes, with the chips embedded therein under the pressure created within the hole by advancement of the tap and thereby extruding the material and the thread chips from the hole through the flutes of the tap, then retracting the tap from the hole and conveying therewith the unexpelled material contained within the tap flutes.

5. A method of tapping which comprises inserting into a blind hole a plug of extrudable waxy material containing a cutting lubricant and being of such viscous nature as to immobilize chips cut by the tap against independent movement and as to be extrudable through the tap flutes with the chips embedded therein and the said plug conforming in dimension substantially to the hole, then advancing a tap into the hole, and thereby expelling the waxy material from the hole, then extracting the tap and conveying therewith during extraction the unexpelled material contained within the tap flutes.

6. In the art of tapping a hole to produce a thread therein, the method which comprises filling the hole prior to tapping with an extrudable material capable of immobilizing chips against independent movement, advancing the tap into the hole and thereby immobilizing the chips as they are formed in the matrix of extrudable material, and simultaneously displacing the extrudable material from the hole and conveying the immobilized chips therewith.

ERVING M. BOEHMLER.